United States Patent
Beaury et al.

(10) Patent No.: US 9,213,499 B2
(45) Date of Patent: Dec. 15, 2015

(54) METHOD FOR TRANSFERRING DATA BETWEEN A POSITION-MEASURING DEVICE AND AN ASSOCIATED PROCESSING UNIT AND POSITION-MEASURING DEVICE THEREFOR

(71) Applicant: DR. JOHANNES HEIDENHAIN GmbH, Traunreut (DE)

(72) Inventors: Bernhard Beaury, Uebersee (DE);
Alexander Kobler, Burgkirchen (DE);
Stephan Kreuzer, Surberg-Ettendorf (DE); Markus Mooshammer, Traunstein (DE); Michael Walter, Polling (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 0 days.

(21) Appl. No.: 14/275,973

(22) Filed: May 13, 2014

(65) Prior Publication Data
US 2014/0344479 A1    Nov. 20, 2014

(30) Foreign Application Priority Data

May 15, 2013    (DE) .......................... 10 2013 209 019

(51) Int. Cl.
*G06F 3/00*    (2006.01)
*G06F 3/06*    (2006.01)
(Continued)

(52) U.S. Cl.
CPC .......... *G06F 3/0659* (2013.01); *G05B 19/0423* (2013.01); *G05B 19/414* (2013.01); *G06F 3/061* (2013.01); *G06F 3/0673* (2013.01)

(58) Field of Classification Search
CPC ..... G06F 3/0659; G06F 3/061; G06F 3/0673; G05B 19/414; G05B 19/04213
See application file for complete search history.

(56) References Cited

U.S. PATENT DOCUMENTS 5,687,103  A  * 11/1997  Hagl et al. .................... 702/150
7,289,438  B2 * 10/2007  Wastlhuber et al. .......... 370/229
(Continued)

FOREIGN PATENT DOCUMENTS

DE    10050392 A1    4/2002
DE    10241183 A1    4/2003
(Continued)

OTHER PUBLICATIONS

Heidenhain GmbH: "EnDat 2.2—Bidirectional Interface for Position Encoders", Internet Citation, Nov. 30, 2008, pp. 1-20, XP002659570, http://www.heidenhain.in/fileadmin/pdb/media/img/383_942-25_EnDat_2-2_en.pdf.

*Primary Examiner* — Henry Tsai
*Assistant Examiner* — Jing-Yih Shyu
(74) *Attorney, Agent, or Firm* — Leydig, Voit & Mayer, Ltd.

(57) ABSTRACT

A method for transferring data between a position-measuring device and an associated processing unit includes transferring first data having a first priority in successive cycles from the position-measuring device to the processing unit. The successive cycles are in each case initiated by a request command by the processing unit requesting the first data from the position-measuring device. Second data having a second, lower priority is transferred from the position-measuring device to the processing unit in at least a portion of the successive cycles with the first data. Types of the second data being transferred in a respective one of the successive cycles are variable. At least one particular type, of the types of the second data to be transferred, is assigned to individual cycles of the successive cycles using information stored in the position-measuring device without involvement of the processing unit.

11 Claims, 5 Drawing Sheets

(51) Int. Cl.
*G05B 19/042* (2006.01)
*G05B 19/414* (2006.01)

(56) References Cited

U.S. PATENT DOCUMENTS

| | | | |
|---|---|---|---|
| 8,881,165 B2 * | 11/2014 | Chambliss et al. | 718/104 |
| 2002/0015389 A1 | 2/2002 | Wastlhuber et al. | |
| 2004/0133373 A1 | 7/2004 | Braasch et al. | |
| 2009/0015423 A1 | 1/2009 | Wagner et al. | |
| 2010/0023791 A1 | 1/2010 | Francescon et al. | |
| 2011/0213586 A1 * | 9/2011 | Kobler et al. | 702/150 |

FOREIGN PATENT DOCUMENTS

| | | |
|---|---|---|
| EP | 0660209 B1 | 6/1995 |
| EP | 1168120 A2 | 1/2002 |
| EP | 2017678 A1 | 1/2009 |
| EP | 2148178 A1 | 1/2010 |
| JP | 11136266 A * | 5/1999 |

* cited by examiner

FIG 5

| cycle | request | \  | answer | | | | |
|---|---|---|---|---|---|---|---|
| cycle 0: | REQ DATA1 | | POS1 | LPH | SPEED | TEMP 1 | BGR | DIAG |
| cycle 1: | REQ DATA1 | | POS1 | LPH | SPEED | POS2 | SF | ERR |
| cycle 2: | REQ DATA1 | | POS1 | LPH | SPEED | SENSOR 1 | BGR | WRN |
| cycle 3: | REQ DATA1 | | POS1 | LPH | SPEED | TEMP 1 | BGR | SENSOR 2 |
| cycle 4: | REQ DATA1 | | POS1 | LPH | SPEED | POS2 | SF | DIAG |
| cycle 5: | REQ DATA1 | | POS1 | LPH | SPEED | SENSOR 1 | BGR | ERR |
| cycle 6: | REQ DATA1 | | POS1 | LPH | SPEED | TEMP 1 | BGR | WRN |
| cycle 7: | REQ DATA1 | | POS1 | LPH | SPEED | POS2 | SF | SENSOR 2 |
| cycle 8: | REQ DATA1 | | POS1 | LPH | SPEED | SENSOR 1 | BGR | DIAG |
| cycle 9: | REQ DATA1 | | POS1 | LPH | SPEED | TEMP 1 | BGR | ERR |
| cycle 10: | REQ DATA1 | | POS1 | LPH | SPEED | POS2 | SF | WRN |
| cycle 11: | REQ DATA1 | | POS1 | LPH | SPEED | SENSOR 1 | BGR | SENSOR 2 |
| cycle 12: | REQ DATA1 | | POS1 | LPH | SPEED | TEMP 1 | BGR | DIAG |
| cycle 13: | REQ DATA1 | | POS1 | LPH | SPEED | POS2 | SF | ERR |
| cycle 14: | REQ DATA1 | | POS1 | LPH | SPEED | SENSOR 1 | BGR | WRN |
| cycle 15: | REQ DATA1 | | POS1 | LPH | SPEED | TEMP 1 | BGR | SENSOR 2 |
| cycle 16: | REQ DATA1 | | POS1 | LPH | SPEED | POS2 | SF | DIAG |
| cycle 17: | REQ DATA1 | | POS1 | LPH | SPEED | SENSOR 1 | BGR | ERR |
| cycle 18: | REQ DATA1 | | POS1 | LPH | SPEED | TEMP 1 | BGR | WRN |
| cycle 19: | REQ DATA2 | | POS1 | LPH | ERR | WRN | POS2 | SF |
| cycle 20: | REQ DATA2 | | POS1 | LPH | ERR | WRN | BGR | TEMP 1 |
| cycle 21: | REQ DATA0 | | POS1 | LPH | BGR | | | |
| cycle 22: | REQ DATA2 | | POS1 | LPH | ERR | WRN | POS2 | SF |

METHOD FOR TRANSFERRING DATA BETWEEN A POSITION-MEASURING DEVICE AND AN ASSOCIATED PROCESSING UNIT AND POSITION-MEASURING DEVICE THEREFOR

CROSS-REFERENCE TO PRIOR APPLICATIONS

Priority is claimed to German Patent Application No. DE 10 2013 209 019.6, filed on May 15, 2013, the entire disclosure of which is hereby incorporated by reference herein

FIELD

The present invention relates to a method for transferring data between a position-measuring device and an associated processing unit, and to a position-measuring device capable of carrying out the method.

In the aforementioned method, data having a first priority (hereinafter referred to as "first data") is transferred in successive cycles from the position-measuring device to the processing unit, and at least in a portion of the cycles, data having a second, lower priority (hereinafter referred to as "second data") is also transferred from the position-measuring device to the processing unit in addition to the first data. The type of the second data transferred in a respective cycle may vary between the individual cycles. In order to initiate a data transfer cycle, first data is in each case requested by the processing unit via a request command.

BACKGROUND

European Patent EP 0 660 209 B1, for example, describes a method and device for serial data transmission between a position-measuring device and a processing unit, according to which the processing unit can request from the position-measuring device both position measurement values and parameter data, such as warnings, alarms or correction values, via so-called "status commands." In the case of a request for parameter data, the status commands are also used to select that memory area of the position-measuring device in which the currently requested type of parameter data (e.g., warnings or alarms) is stored.

SUMMARY

In an embodiment, the present invention provides a method for transferring data between a position-measuring device and an associated processing unit. First data having a first priority is transferred in successive cycles from the position-measuring device to the processing unit. The successive cycles are in each case initiated by a request command by the processing unit requesting the first data from the position-measuring device. Second data having a second, lower priority is transferred from the position-measuring device to the processing unit in at least a portion of the successive cycles with the first data. Types of the second data being transferred in a respective one of the successive cycles are variable. At least one particular type, of the types of the second data to be transferred, is assigned to individual cycles of the successive cycles using information stored in the position-measuring device without involvement of the processing unit.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 5 shows an example illustrating the processing of transmission lists which are based on a block structure according to FIGS. 3 and 4A-4C;

DETAILED DESCRIPTION

Figure 1:
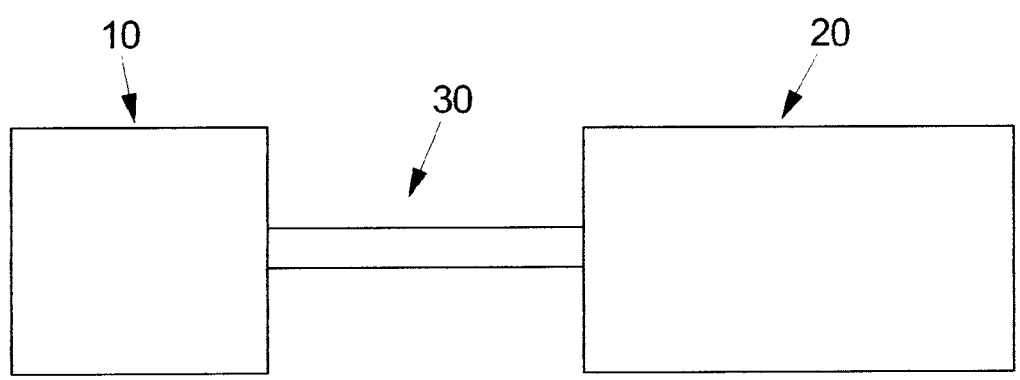
FIG. 1 schematically illustrates a system for transferring data, including a position-measuring device and a processing unit.

In the method of the type mentioned at the outset, the first data of comparatively high priority may be, in particular, position measurement values which are acquired at the position-measuring device and intended to be transferred to the processing unit for further processing and evaluation, where necessary. Moreover, the first data may be speed or acceleration values acquired at the position-measuring device. This means that the term "position-measuring device" as used herein is not only understood to mean a measuring device capable of generating position measurement values or changes of position measurement values per se, but to include also measuring devices capable of measuring the time dependence of position values, in particular in the form of speed or acceleration values.

The position-measuring device may also be what is known as a touch probe, which has a deflectable stylus capable of sensing (by touch) the spatial boundaries of an object, even in a time-dependent manner.

The second data of comparatively low priority may, on the one hand, be physical state variables which may be relevant, for example, for the control of the position-measuring device and/or during the processing and evaluation of the measurement values of high priority, such as temperature measurement values and possibly speed or acceleration values (unless these are treated as data of high priority), or, on the other hand, status information regarding the position-measuring device, for example, diagnosis information, error messages or warnings, and also memory contents.

In order to ensure in such a method that the high-priority first data, in particular in the form of position, speed or acceleration measurement values, can in each case be available as current values at the processing unit, the duration of the individual cycles during which first data is transferred to the processing unit should be as short as possible. This, in turn, means that not all possibly relevant second data of low priority can be transferred to the processing unit in a respective cycle. Therefore, the second data to be provided to the processing unit can be distributed over and transferred in several cycles, for example, to transfer temperature measurement values and diagnosis information in one cycle and possible warnings and error messages in another cycle.

In an embodiment, the present invention further simplifies a method and a position-measuring device of the type mentioned at the outset.

In the method of the type mentioned at the outset, it is further provided that the information required to assign at least one type of second data, for example, temperature measurement values and/or diagnosis information and/or warnings, etc., to a respective cycle in which second data is to be transferred to the processing unit is provided in the position-measuring device, and in such a way that the assignment of second data to individual cycles can be carried out without the involvement of the processing unit.

In this way, the data transfer between the position-measuring device and the associated processing unit is relieved of load and simplified, because there is no need for special commands via which the processing unit would in each case have to request specific second data (of low priority) from the position-measuring device. Instead, the position-measuring device can be configured such that, during operation thereof, the second data is assigned in a defined way to specific cycles of the data transfer from the position-measuring device to the processing unit.

The method of the present invention, in an embodiment, is applied in the context of what is known as a "request/answer scheme" of data transfer, in which the position, speed, or acceleration measurement values currently acquired in the position-measuring device are in each case requested by the processing unit via corresponding request commands. In response to the respective request command, or in response to a separate command of the processing unit, it may also be determined from the information stored in the position-measuring device whether, and if so, which second data is to be transferred (from the position-measuring device to the processing unit) in the cycle initiated by the request command.

The information that is used to assign specific (predeterminable) second data to the individual cycles during data transfer from the position-measuring device to the processing unit may be provided using transmission lists stored in the position-measuring device (in a volatile or non-volatile memory). By using at least one transmission list, it is possible to determine, during the operation of the position-measuring device, which type of second data is to be transferred in a respective cycle of the data transfer. In particular, in response to a respective request command used to initiate a new cycle of the data transfer, or in response to a separate command of the processing unit, it may be determined from a transmission list (in the position-measuring device) associated with the request command whether, and if so, which second data is to be transferred in the cycle initiated by the request command.

Thus, a respective transmission list may define sequences of second data which will be assigned to individual cycles of the data transfer in an order defined by the transmission lists. Specifically, the sequences of second data defined in the at least one transmission list may indicate which type of second data is to be transferred as part of a particular data sequence from the position-measuring device to the processing unit (in a particular cycle). For example, a data sequence defined in a transmission list may indicate that a temperature measurement value and a particular diagnosis information are to be transferred to the processing unit if the corresponding sequence of second data was assigned to a cycle of the data transfer.

It may be provided, in particular, that in the position-measuring device, the sequences of second data are combined into several transmission lists in the form of a plurality of different data blocks, which each define at least one sequence of second data, and at least a portion of which define several sequences of second data, and that in a given time interval, the position-measuring device in each case assigns sequences of second data from exactly one of the data blocks to the individual cycles of the data transfer (in a predetermined order), and that for different time intervals, different data blocks may be provided for processing.

Thus, a respective transmission list or a respective data block defines a particular order in which the different types of second data, for example, temperature measurement values, different items of status information, etc., will be assigned to the individual cycles of the data transfer. In one variant, the position-measuring device may, in each case, itself define (for example, in an event-triggered fashion) the respective data block from which sequences of second data are currently assigned to the individual cycles. In particular however, the selection of a particular transmission list or data block to be processed may be made by the processing unit via corresponding request commands.

The transmission lists or data blocks do not contain the actual data to be transferred, which is not generated until later during operation of the position-measuring device, but merely indicate which type(s) of second data is/are to be assigned to the individual cycles of the data transfer.

As mentioned earlier hereinabove, the processing unit may be involved in the selection of the transmission list or data block from which the second data is to be assigned to the individual cycles of the data transfer, for example, in that the processing unit sends a corresponding command if the processing and evaluation of data requires information that corresponds to the processing of a particular data block, or routinely in the context of the request commands with which the individual cycles of the data transfer are initiated. That is, while the method may be carried out without the involvement of the processing unit in the selection of the respective second data to be transferred, it is not intended to preclude intervention of the processing unit in order, for example, to adequately respond to current events, such as error messages or warnings. However, the transmission lists defining the type of second data to be transferred are stored in the position-measuring device.

Furthermore, measures may be provided to optimize the memory organization in order to allow the largest possible number of transmission lists or data blocks containing different sequences of second data to be stored in the position-measuring device using as little memory space as possible.

For this purpose, firstly, advantage can be taken of the fact that the sequences of second data that are combined into a data block do not necessarily differ in all the data to be transferred in a respective data sequence, but that a particular type of second data may perfectly well be transferred in each data sequence of a data block or at least in each n-th sequence of second data. For example, provision could be made to transfer a temperature value with each sequence of second data of a particular data block and/or to transfer a particular item of diagnosis information with each second data sequence. In this case, there is no need to explicitly provide that the corresponding type of second data, such as a temperature measurement value, be transferred in each individual sequence of second data. Instead, it may be agreed that particular types of second data, such as the temperature measurement values mentioned here by way of example, are to be assigned in periodic/rolling manner to all sequences of second data or to each n-th sequence of second data.

Secondly, it is possible that individual data blocks may differ from each other in that one data block contains, for example, all sequences of second data of another data block and also includes further sequences of second data and/or an extension of the data sequences from the other data block. In this case, there is no need to use separate memory areas for the two data blocks mentioned. Rather, it suffices to store one of the two data blocks as well as the differences between the data blocks, which significantly reduces the memory requirements.

In an embodiment, the present invention provides a position-measuring device which can be used for data transfer, in particular in the context of the method of an embodiment of the present invention.

FIG. 1 schematically shows a position-measuring device 10 and a processing unit 20 between which data can be exchanged via data lines 30.

The type of the position measurement values generated by position-measuring device 10 is not relevant here. Position-measuring device 10 may be both a length-measuring device and an angle-measuring device, and the respective position measurement values may be obtained by scanning a measuring standard using very different physical principles for example, photoelectric, magnetic or inductive measuring principles. Further, the measurement values obtained by the position-measuring device 10 may be both incremental values relating to a relative position of a scanning unit with respect to a measuring standard, and absolute values indicating the absolute position of a scanning unit with respect to a measuring standard.

Moreover, the measurement values obtained by position-measuring device 10 do not necessarily have to be position measurement values in the narrow sense here, but may rather be measurement values which describe the time dependence of the spatial position of an object, such as a rotatably mounted shaft; i.e., in particular speed or acceleration measurement values.

Furthermore, the position-measuring device 10 may be designed as a touch probe capable of sensing spatial boundaries of objects, such as object edges and surfaces, by means of a stylus. The possibly time-dependent spatial position of the object boundaries to be identified is then represented by measurement values containing information as to whether, and if so, when the stylus was deflected.

The aforedescribed types of measurement values are hereinafter simply referred to as "(high-priority) measurement values." These measurement values contain information about the spatial position of an object and/or the time dependence of the position in the form of speed or acceleration values.

What is important here is that position-measuring device 10 scans a measuring standard by means of a scanning unit, thereby obtaining measurement values (in any way) which are to be transferred to a processing unit 20 for further processing and evaluation. Processing unit 20 may be, for example, a machine controller (NC controller), which controls a machine tool based on the measurement values obtained by position-measuring device 10. In this case, position-measuring device 10 may be used, in particular, to measure the movement of two relatively movable components of the machine tool, for example, the movement of a carriage or a shaft of a machine tool relative to a stationary assembly of such machine.

Further, during operation of position-measuring device 10, it may be necessary to transfer to processing unit 20 not only the currently acquired position, speed, or acceleration measurement values, but also additional data for example, temperature measurement values as well as information about the state of the position-measuring device 10, such information including alarms and warnings. This is well known in the art and, merely by way of example, reference is made to EP 0 660 209 B1 in this regard.

In the present case, the position measurement values to be transferred from position-measuring device 10 to processing unit 20 may be the data of comparatively high priority (high-priority data), which is referred to as "first data" herein.

In contrast, the other data to be transferred from position-measuring device 10 to processing unit 20, for example, temperature, speed and acceleration values as well as information about the state of position-measuring device 10, would have to be considered data of lower priority, which is referred to as "second data" herein.

In order for the high-priority measurement values currently acquired at position-measuring device 10 to be transferred to processing unit 20 in a quick-response manner for highly dynamic control, the cycles within which the respective current measurement values are transferred to processing unit 20 should be as short as possible. Therefore, it would not be productive to transfer both the high-priority measurement values currently present in the position-measuring device 10 and all the possibly relevant further, second data from position-measuring device 10 to processing unit 20 in a respective cycle. Instead, the second data of lower priority is distributed over and transferred in several cycles from position-measuring device 10 to processing unit 20 (in each case after the high-priority measurement values), for example, temperature measurement values and certain warnings in one cycle, speed and acceleration values in another cycle, etc.

For further details in this regard, reference is again made to EP 0 660 209 B1, in which additional data currently needed by the processing unit (there called "parameter data") is in each case requested from the position-measuring device 10 via specific status commands.

In contrast, in the system illustrated and described herein, the transfer of second data of lower priority from position-measuring device 10 to processing unit 20, distributed over the individual cycles of the data transfer, does not require any control on the part of processing unit 20, but it is nevertheless possible to transfer different second data from position-measuring device 10 to processing unit 20 from cycle to cycle.

This approach is feasible both in the context of what is known as a "request/answer scheme" and the corresponding protocols, where current measurement values of high priority are in each case requested by processing unit 20 via a request command, and also when employing cyclic modes of operation, where position-measuring device 10 transfers position measurement values to processing unit 20 in each case automatically (cyclically) at predetermined intervals. In the present case, the first-mentioned variant is concerned.

The here required data exchange between position-measuring device 10 and processing unit 20 takes place via the data lines 30 indicated in FIG. 1 in a merely schematic way. Depending on the specific implementation of the data transfer, these lines may be a plurality of unidirectional lines, at least one bidirectional line, etc.

Figure 2:
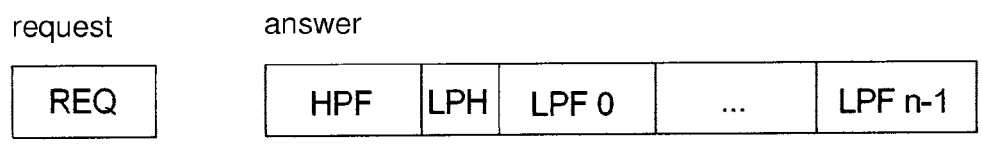
FIG. 2 shows the structure of an exemplary transfer protocol for transferring data between a position-measuring device and a processing unit.

FIG. 2 depicts a possible protocol for the data exchange between position-measuring device 10 and processing unit 20, and more specifically, for the case of a request/answer-based data transfer, in which position-measuring device 10 sends data having a high, first priority, in particular in the form of position measurement values, to processing unit 20, in each case in response to a request from processing unit 20.

Accordingly, FIG. 2 shows a request command REQ, which is sent by processing unit 20 to position-measuring device 10 to request first data (of high priority). This initiates a data transfer cycle in which the position-measuring device 10 first sends first data of high priority, HPF, to processing unit 20, such data being, for example, position measurement values. This data may be used, for example, to perform highly dynamic control of a machine tool. The first data HPF to be transferred may be transferred within a data frame (high priority frame).

Following the high-priority first data, further, second data containing additional information of low priority LPF0, ..., LPFn-1 may then be transferred from position-measuring device 10 to processing unit 20, at least in a portion of the cycles. This second data of low priority may be preceded by a so-called header LPH (low priority header), which contains information about the subsequent additional information of low priority and which is followed by the data containing the additional information of low priority.

Examples of information items which may be contained in header portion LPH of the second data include status messages about the content of the subsequent additional information, information about the number of frames (low priority frames) containing data of second priority to be transferred as additional information, as well as an identifier. The identifier may in particular indicate which type of additional information is to be transferred with the subsequent second data. The identifier may be, for example, a 1-byte data word, so that 256 different items of additional information are distinguishable.

However, the identifier may also be contained in the respective additional information to be transferred after header portion LPH in the form of second data LPF0, ..., LPFn-1, in particular in each of the respective frames (low-priority frames/LPF) and denote the content of the respective frame. This allows subsequent electronics to correctly assign the content of the frames even if the currently processed transmission list is not known there; i.e., the subsequent electronics can check whether the actually expected second data arrives.

The additional information to be transferred after header portion LPH may be formed of second data LPF0, ..., LPFn-1 in one or more data frames (low priority frames). This data may be, for example, sensor data, such as temperature measurement values, speed or acceleration values, or status information regarding the position-measuring device 10 for example, diagnosis information, warnings, error messages and alarms, or also memory contents.

In summary, at least in a portion of the cycles of the data transfer, a sequence of low-priority second data LPF0, ..., LPFn-1 may be transferred from position-measuring device 10 to processing unit 20 in addition to the high-priority first data HPF, in each case initiated by a request command REQ for high-priority first data. Such a sequence of low-priority second data LPF0, ..., LPFn-1 includes here a plurality of low-priority frames, each containing a number of items of second data to be transferred.

In this context, for example, second data of a particular type for example, temperature measurement values, acceleration values, speed values, diagnosis information, warnings, memory contents, etc. may in each case be assigned to exactly one of the frames. Alternatively, data of a particular type may also be distributed over several of the frames, or a single data frame may contain data of different types so that, for example, both temperature measurement values and acceleration values are combined into one data frame. For the sake of simplicity, it is assumed hereinafter that each data frame is assigned to second data of a particular type. For example, the data denoted as LPF0 may form a first data frame, which may be used, for example, to transfer temperature measurement values, while the data denoted as LPF1 form a further frame, which is used to transfer acceleration values, etc.

In the exemplary embodiment, this second data LPF0, ..., LPFn-1 is in each case preceded by a header portion LPH of the type described above.

In order to be able to define, in position-measuring device 10, which data of low priority is in each case to be assigned to individual cycles of the data transfer to processing unit 20, the position-measuring device 10 has stored therein transmission lists, in which are defined a plurality of different sequences of second data which are in each case to be transferred to the processing unit 20 in a cycle (together with first data of higher priority). The transmission lists further indicate the order in which the individual sequences of second data are in each case to be assigned to a cycle of the data transfer.

The transmission lists, for example in the form of data blocks, do not contain the actual data to be transferred, which is not generated until later during operation of position-measuring device 10, but indicate which type(s) of second data is/are to be assigned to the individual cycles of the data transfer.

This will be described in more detail below with reference to FIG. 3, in which a transmission list is in each case represented by one data block.

Figure 3:
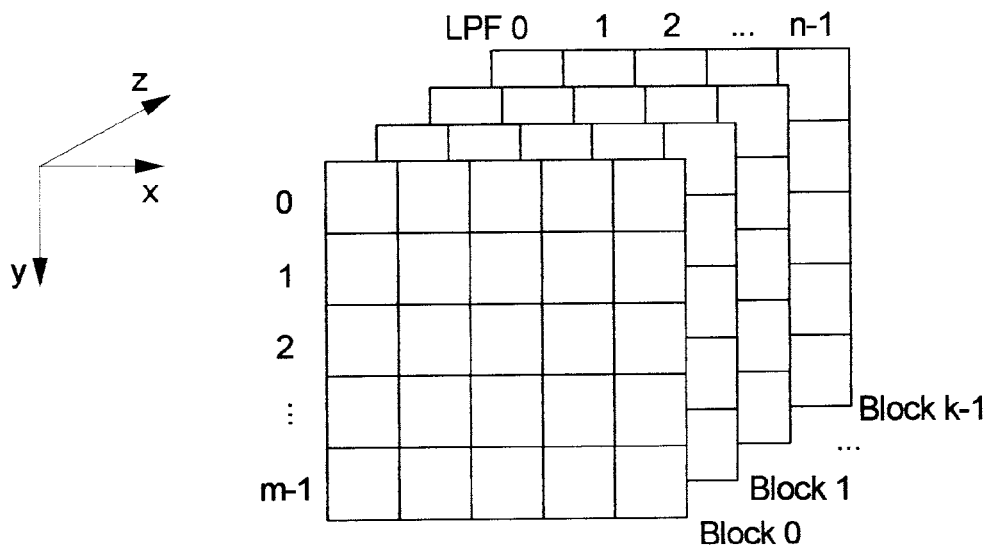
FIG. 3 illustrates a block structure for defining data sequences to be transferred from the position-measuring device to the processing unit.

The transmission lists shown in FIG. 3 in the form of data blocks (block 0, block 1, ..., block k-1) each include a plurality of rows 0, 1, 2, ..., m-1 extending along a first direction (x-direction) and arranged one above the other transversely (vertically) to this direction (along the y-direction), each defining a sequence of second data having the length n.

In other words, each of the m rows of a respective transmission list or of a respective data block indicates which type of second data is to be transferred from position-measuring device 10 to processing unit 20 in a respective cycle. Each sequence of second data includes n frames (low priority frames). Here, by way of example, each of these frames is intended to contain second data of a particular type, as will be explained hereinafter in more detail with reference to FIGS. 4A through 4C.

For instance, when one of the transmission lists, which are each shown in the form of one data block (block 0, block 1, ..., block k-1) in FIG. 3, is processed during operation of position-measuring device 10, the system assigns to a first cycle of the data transfer from position-measuring device 10 to processing unit 20 a sequence of second data which is defined by row "0" of the respective block and which indicates for each of the n data frames the type of low-priority, second data that is to be transferred from position-measuring device 10 to processing unit 20 in the respective cycle.

Then, in the next cycle of the data transfer, the sequence of second data defined in row "1" of the respective data block is transferred and so on until finally row "m" of the data block is reached. Subsequently, the system may switch to another transmission list in the form of another data block or process the same data block again starting with the first row "0."

Thus, by defining the transmission lists in the form of data blocks stored in the position-measuring device 10, a user is able to determine which type(s) of low-priority second data is/are to be transferred from position-measuring device 10 to processing unit 20 in a respective cycle of the data transfer, and in the process also to define the order in which different sequences of second data will in each case be assigned to individual cycles of the data transfer.

In this context, the population of the individual rows of a transmission list or data block with specific data of the second type may vary from data block to data block in many ways, as will also be explained hereinafter in more detail with reference to FIGS. 4A through 4C.

This allows processing unit 20 to be involved, if necessary, in the definition of the low-priority second data to be transferred in the individual cycles of the data transfer, as mentioned earlier herein. For example, it may be provided that processing unit 20 may select, via specific commands, another transmission list or another block which then in each case defines the second, low-priority data to be currently transferred in the individual cycles.

Figure 4C:
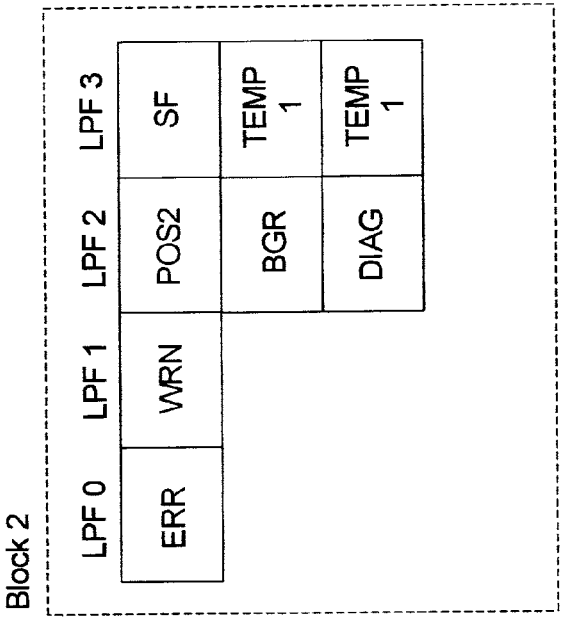
FIGS. 4A through 4C show three exemplary data blocks of a block structure according to FIG. 3.
Figure 4B:
Figure 4A:
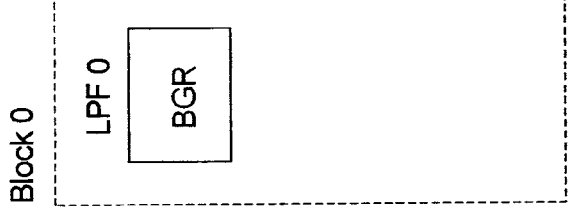

In FIGS. 4A through 4C, specific exemplary structures of transmission lists or data blocks are illustrated for three data blocks (block 0, block 1, block 2).

Data block 0 shown in FIG. 4A includes, as a transmission list, only one entry in the form of a frame of low-priority, second data LPF0 which defines that second data BGR of a single specific type will always be transferred in a respective cycle as long as the transmission list represented by data block 0 is processed during data transfer from position-measuring device 10 to processing unit 20. This data block may be one that is fixedly defined by the manufacturer of the measuring device and used during the initialization phase, in which a user writes the contents of the other (user-definable) transmission lists in the form of data blocks into the memory of the position-measuring device 10. Accordingly, in general terms, both transmission lists fixedly defined by the manufacturer of the measuring device and transmission lists which may be freely defined by the respective user can be stored in the form of data blocks in the memory of the position-measuring device 10. The second data BGR mentioned here by way of example is response data of a slow background channel (background data), which channel allows, for example, reading of a memory of the measuring device during the measurement mode.

Furthermore, in principle, a respective transmission list or a respective data block may be stored in position-measuring device 10 in either a volatile or non-volatile manner. Accordingly, position-measuring device 10 is provided with the required volatile and/or non-volatile memories (RAM and/or ROM, EEPROM, . . . ).

Overall, the possibility of creating transmission lists or data blocks gives a user substantial freedom in defining low-priority, second data which may be transferred from position-measuring device 10 to processing unit 20 during operation of the position-measuring device 10 in a specific order and distributed over different cycles of the data transfer (without requiring processing unit 20 to send any commands).

FIG. 4B shows a data block 1 having a first data sequence (in row "0") including four data frames containing low-priority, second data LPF0, LPF1, LPF2 and LPF3. The data of the first frame serves to represent speed values (SPEED), the data of the second frame serves to represent temperature measurement values (TEMP), the data of the third frame serves to represent background data (BGR), and the data of the fourth frame serves to represent diagnosis information.

The transmission list shown in FIG. 4B in the form of data block 1 has the special feature that each of the total of four data sequences defined by the four rows "0, 1, 2, 3" of data block 1 begins with a frame of second data LPF0 that is intended to indicate speed values (SPEED). However, in order to minimize the memory requirements for the transmission list or the data block, the respective frame containing said second data in the form of speed values (SPEED) is explicitly defined only in the first data sequence (from row "0" of data block 1). In the three further sequences of second data (in rows "1", "2" and "3" of data block 1), the location at which a first frame of second data would have to be defined is in each case left free. This is because the frame of second data LPF0 which is defined for the first data sequence and which initiates the transfer of current speed values (SPEED) is always to be repeated there during the processing of the data block (then with the respective current speed values, which may vary from data sequence to data sequence).

Overall, as data block 1 of FIG. 4B is processed during the operation of the position-measuring device 10, each of the four columns of data block 1 is repeated with a period corresponding to the length of the respective column. The same applies to data block 2 shown in FIG. 4C. This is further illustrated with reference to FIG. 5, which shows an exemplary processing of transmission lists in the form of data blocks 0, 1 and 2 from FIGS. 4A-4C. In the exemplary embodiment, in each of the first 19 cycles, namely in cycles 0 through 18, data block 1 is processed in such a way that position data POS1 representing high-priority first data is transferred in response to a request command REQ DATA1 from processing unit 20, whereupon low-priority second data is transferred in the form of sequences of second data which, in each case, correspond to a respective one of the rows of data block 1 from FIG. 4B; the total of four rows of the data block in each case being successively assigned to successive data cycles. According to FIG. 5, data block 1 from FIG. 4B is processed until the system switches to the processing of data block 2 from FIG. 4C. This may either be predetermined by configuring the transmission lists accordingly or be triggered by a corresponding request command of processing unit 20. Subsequently, data block 0 is processed once in cycle 21, whereupon the system returns to the processing of data block 2.

A change from one transmission list to another or from one data block to another initiated by the position-measuring device 10 itself may be implemented to be controlled by events, such as the exceeding of a predetermined temperature in the vicinity of the measurement. In such a case, for example if the temperature in the measuring device reaches critical values, switching to another transmission list or another data block may cause diagnostic or warning messages to be output as well.

It will normally be expedient if the selection of the respective transmission list or data block to be processed is made by processing unit 20 which, to this end, sends a corresponding command to position-measuring device 10. This command may be part of a position request command (e.g., REQ DATA0, REQ DATA1 or REQ DATA2) with which processing unit 20 requests transfer of measurement values (e.g., POS1), or an addition to such a request command. Alternatively, there may be provided a special command (switchover or selection command) which is separate from the position request commands and which is transferred from processing unit 20 to position-measuring device 10 in order to select the transmission list to be currently processed. This applies correspondingly in a cyclic operation where, upon activation thereof, position-measuring device 10 continuously sends measurement values to processing unit 20 without separate request commands being associated with the respective measurement values. Here, the transmission list to be processed can be defined in connection with the command that activates the cyclic operation.

FIG. 5 very clearly illustrates the periodic or rolling repetition of individual rows of data blocks 0, 1 and 2 (with a period corresponding to their length in the y-direction). Repeating individual rows of different length of the transmission lists or data blocks in a periodic or rolling manner, as explained with reference to FIGS. 4A through 4C, facilitates a reduction of the memory requirements for the storage of the transmission lists or data blocks in the position-measuring device 10, because not all of the sequences of second data to be defined in a respective data block need to be completely stored in a row of the data block, as is apparent, in particular, when viewing FIGS. 4B, 4C and 5 together.

Thus, in summary, it is provided that at least one type of second data which, according to a transmission list (block 0, block 1, block 2, . . . ) is in each case to be assigned to individual cycles of the data transfer as part of different sequences of second data, is only defined in a portion of those different sequences of second data, and that the transfer together with the other portion of those different sequences of second data is accomplished by periodically repeating said type of second data (TEMP, SPEED, DIAG, ERR, WRN) during the processing of the respective transmission list (block 0, block 1, block 2, . . . ).

Figure 6:
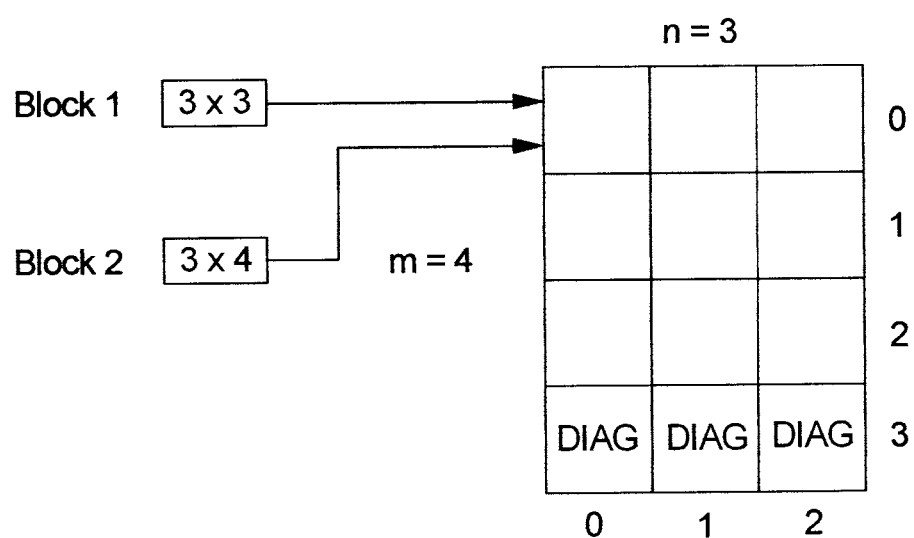
FIG. 6 schematically illustrates a space-saving memory organization in the position-measuring device.

FIG. 6 illustrates another option for memory-optimized storage of transmission lists, which is based on the fact that normally different data blocks partially coincide in terms of the sequences of second data defined therein, so that not each individual list or data block needs to be completely stored in a separate memory area of the position-measuring device 10. Rather, it may be sufficient that only a portion of the data blocks be completely stored in the position-measuring device 10 and that, with respect to further data blocks, only the differences from the completely stored data blocks be indicated. This is illustrated in FIG. 6 in a specific example for two data blocks.

Considered here is an exemplary case where a user wishes to receive additional diagnosis information from the position-measuring device 10 during operation thereof, but where, apart from that, the second data intended to be transferred to the processing unit continues to be the data that is sent from the position-measuring device 10 to the processing unit during processing of the current transmission list, e.g., in the form of data block 1. In this case, it is possible to use, as a transmission list, a new data block 2 which contains all the entries of the currently used data block 1 and, in addition, contains also, for example, a data sequence that is defined in an additional row "3" of the data block and contains diagnosis information DIAG, as illustrated in FIG. 6.

Then, the two transmission lists according to data block 1 and data block 2 need not be stored separately in the memory of the position-measuring device 10. Rather, as illustrated in FIG. 6, it suffices to store in the memory the contents that the two transmission lists according to data block 1 and data block 2 have in common and, in addition, also the additional contents of the more comprehensive transmission list according to data block 2, here in an additional, fourth row.

Each of the two data blocks 1, 2 points with a respective pointer to the start of its configuration and contains an indication of the size of the configuration memory assigned thereto, for example, 3×3 in the case of data block 1 and 3×4 in the case of data block 2. This makes it possible to store a plurality of transmission lists in the form of data blocks in a memory-saving manner in the memory of a position-measuring device 10.

Specifically, in the exemplary embodiment according to FIG. 6, the two data blocks 1 and 2 point with their pointers to the same address of the memory, and a differentiation of the two blocks is accomplished by indicating the size of the respective memory area occupied.

In more general terms, at least two transmission lists (block 1, block 2) having some contents in common are stored in position-measuring device 10 in such a way that the transmission lists (block 1, block 2) use the same memory space in position-measuring device 10 for identical contents, it being possible to differentiate the two transmission lists (block 1, block 2) by identifying the total memory areas occupied by the respective transmission list (block 1, block 2).

Overall, the approach described with reference to FIGS. 1 through 6 allows additional information in the form of low-priority second data that differs from cycle to cycle to be automatically sent from position-measuring device 10 to processing unit 20 without having to prompt position-measuring device 10 to do so by means of a separate control input. In particular, by defining transmission lists, e.g., in the form of data blocks, a particular user himself or herself can define the contents that are in each case to be transferred as additional information. In addition, however, the type of the additional information to be transferred in the form of low-priority second data may also be changed (with cycle accuracy by the evaluation unit sending corresponding commands), for example to be able to respond to events such as error messages or warnings. There is also achieved a memory-optimized storage of the transmission lists in the position-measuring device 10.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for transferring data between a position-measuring device and an associated processing unit, the method comprising:

transferring first data having a first priority in successive cycles from the position-measuring device to the processing unit, the successive cycles being in each case initiated by a request command by the processing unit requesting the first data from the position-measuring device;

transferring second data having a second, lower priority from the position-measuring device to the processing unit in at least a portion of the successive cycles with the first data, wherein types of the second data being transferred in a respective one of the successive cycles are variable;

assigning at least one particular type, of the types of the second data to be transferred, to individual cycles of the successive cycles using information stored in the position-measuring device without involvement of the processing unit; and defining sequences of the second data, for use in the assigning, in an order defined by at least one transmission list stored in a memory of the position-measuring device.

2. The method as recited in claim 1, further comprising, in response to a first command that is at least one of a respective one of the request commands and a separate command of the processing unit, determining from the information stored in the position-measuring device whether and which of the second data will be transferred in a respective one of the successive cycles initiated by the first command.

3. The method as recited in claim 1, wherein the first data includes at least one of position, speed and acceleration measurement values.

4. The method as recited in claim 1, wherein the types of the second data differ from each other in at least one of a respective physical quantity represented by them and a respective state of the position-measuring device to which they relate.

5. The method as recited in claim 1, wherein the at least one transmission list is a plurality of transmission lists into which the sequences of the second data are combined in a form of different data blocks, each of the data blocks defining at least one sequence of the sequences of the second data, and at least a portion of the data blocks defining several of the sequences of the second data, and wherein, in a given time interval of a data transfer, the position-measuring device in each case assigns the sequences of the second data to the individual cycles according to one of the transmission lists.

6. The method as recited in claim 1, further comprising selecting the at least one transmission list by one of the request commands.

7. The method as recited in claim 1, further comprising, in response to a first command that is at least one of a respective one of the request commands and a separate command of the processing unit, determining from a first one of the at least one transmission list associated with the first command whether and which of the second data will be transferred in a respective one of the successive cycles initiated by the first command.

8. The method as recited in claim 1, wherein the second data is transferred frame by frame in individual frames, and wherein contents of each of the individual frames of the second data are denoted by an identifier.

9. A position-measuring device configured to send, during operation, first data having a first priority in successive cycles to a processing unit and configured to send, at least in a portion of the successive cycles, second data having a second, lower priority to the processing unit with the first data, wherein types of the second data being transferred in a respective one of the successive cycles are variable, the successive cycles being in each case initiated by a request command by the processing unit requesting the first data from the position-measuring device, wherein the position-measuring device is configured to assign at least one particular type, of the types of the second data to be transferred, to individual cycles of the successive cycles without involvement of the processing unit based on at least one transmission list stored in a memory of the position-measuring device which defines sequences of the second data which will be assigned to the individual cycles in an order defined by the at least one transmission list.

10. The position-measuring device as recited in claim 9, wherein the position-measuring device is adapted to generate at least one of position, speed and acceleration measurement values as the first data.

11. The position-measuring device as recited in claim 9, wherein the at least one transmission list is a plurality of transmission lists into which the sequences of the second data are combined in a form of different data blocks, each of the data blocks defining at least one of the sequences of the second data, and at least a portion of the data blocks defining several of the sequences of the second data, and wherein, in a given time interval of a data transfer, the position-measuring device in each case is configured to assign the sequences of the second data to the individual cycles according to one of the transmission lists.

\* \* \* \* \*